(12) United States Patent
Faruque et al.

(10) Patent No.: US 12,344,188 B1
(45) Date of Patent: Jul. 1, 2025

(54) LOAD-LIMITING SEATBELT RETRACTOR

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/601,133

(22) Filed: Mar. 11, 2024

(51) Int. Cl.
*B60R 22/46* (2006.01)

(52) U.S. Cl.
CPC ........ *B60R 22/46* (2013.01); *B60R 2022/468* (2013.01)

(58) Field of Classification Search
CPC ............ B60R 22/4623; B60R 22/4619; B60R 2022/468; B60R 22/46
See application file for complete search history.

(56) References Cited

U.S. PATENT DOCUMENTS

| | | | |
|---|---|---|---|
| 4,568,037 A | 2/1986 | Kawaguchi et al. | |
| 5,895,002 A | 4/1999 | Sasaki et al. | |
| 5,906,328 A | 5/1999 | Hamaue et al. | |
| 5,938,135 A | 8/1999 | Sasaki et al. | |
| 6,105,893 A | 8/2000 | Schmidt et al. | |
| 6,354,528 B1 | 3/2002 | Nagata et al. | |
| 6,416,008 B1 | 7/2002 | Fujii et al. | |
| 6,443,380 B1 * | 9/2002 | Biller | F16D 25/087 280/806 |
| 9,132,804 B2 | 9/2015 | Maemura et al. | |
| 9,321,429 B2 * | 4/2016 | Saito | B60R 22/4619 |
| 10,086,794 B2 * | 10/2018 | Jaradi | B60R 22/105 |
| 10,421,429 B2 * | 9/2019 | Vo | B60R 22/38 |
| 10,442,396 B2 * | 10/2019 | Faruque | B60R 22/3413 |

(Continued)

FOREIGN PATENT DOCUMENTS

| | | | | |
|---|---|---|---|---|
| CN | 117125021 A | * | 11/2023 | |
| DE | 102006033545 A1 | * | 1/2008 | ............ B60R 22/46 |

(Continued)

OTHER PUBLICATIONS

WO_2009086819_A2 machine translation from FIT (Year: 2024).*
WO_2009086818_A2 machine translation from FIT (Year: 2024).*

*Primary Examiner* — Paul N Dickson
*Assistant Examiner* — Maxwell L Meshaka
(74) *Attorney, Agent, or Firm* — Frank A. MacKenzie; Brooks Kushman P.C.

(57) ABSTRACT

A seatbelt retractor includes a frame and a spool rotatably supported by the frame. A ring is coaxial with the spool on a rotational axis and is selectively lockable with the spool. A locking device is operatively coupled between the spool and the ring to rotationally engage the spool with the ring in a locked position and rotationally disengage the spool from the ring in an unlocked position. One of the ring or the frame defines a recess and an arm is fixed to and extends from the other of the ring or the frame into the recess. When the locking device is in the locked position, the arm is elastically bendable relative to the ring and the frame when rotational force on the ring relative to the frame about the rotational axis exceeds a non-zero threshold to allow rotation of the ring relative to the frame.

20 Claims, 7 Drawing Sheets

(56) References Cited

U.S. PATENT DOCUMENTS

| | | | |
|---|---|---|---|
| 10,518,742 B2* | 12/2019 | Jaradi | F16D 41/12 |
| 10,632,963 B2* | 4/2020 | Faruque | B60R 22/28 |
| 10,906,504 B2* | 2/2021 | Jaradi | B60R 22/40 |
| 11,046,285 B2* | 6/2021 | Jaradi | B60R 22/3413 |
| 11,180,111 B2* | 11/2021 | Jaradi | B60R 22/3413 |
| 11,554,749 B2* | 1/2023 | Jaradi | B60R 22/3413 |
| 11,577,686 B2* | 2/2023 | Jaradi | B60R 22/36 |
| 11,628,802 B2 | 4/2023 | Modinger et al. | |
| 11,970,131 B2* | 4/2024 | Jaradi | B60R 22/3413 |
| 11,975,681 B1* | 5/2024 | Jaradi | B60R 22/46 |
| 12,043,208 B2* | 7/2024 | Jaradi | B60R 22/343 |
| 2001/0006204 A1 | 7/2001 | Kajiyama | |
| 2004/0065762 A1 | 4/2004 | Mori et al. | |
| 2007/0120002 A1 | 5/2007 | Hori | |
| 2008/0290230 A1 | 11/2008 | Kohlndorfer et al. | |
| 2013/0341451 A1* | 12/2013 | Saito | B60R 22/46 242/381.5 |
| 2016/0250994 A1 | 9/2016 | Lucht et al. | |
| 2016/0375857 A1* | 12/2016 | Jaradi | B60R 22/46 242/374 |
| 2018/0319364 A1* | 11/2018 | Faruque | B60R 22/3413 |
| 2019/0031136 A1* | 1/2019 | Jaradi | B60R 22/46 |
| 2019/0054893 A1* | 2/2019 | Vo | B60R 22/341 |
| 2019/0077366 A1* | 3/2019 | Faruque | B60R 22/3413 |
| 2019/0217814 A1* | 7/2019 | Jaradi | B60R 22/343 |
| 2020/0307507 A1* | 10/2020 | Jaradi | B60R 22/3413 |
| 2020/0307508 A1* | 10/2020 | Jaradi | B60R 22/3413 |
| 2021/0146880 A1* | 5/2021 | Jaradi | B60R 22/343 |
| 2021/0221326 A1* | 7/2021 | Jaradi | B60R 22/36 |
| 2021/0229624 A1 | 7/2021 | Jaradi et al. | |
| 2021/0237680 A1 | 8/2021 | Ge et al. | |
| 2023/0068207 A1 | 3/2023 | Ge et al. | |
| 2023/0271588 A1* | 8/2023 | Jaradi | B60R 22/3413 242/396.2 |
| 2024/0092312 A1* | 3/2024 | Jaradi | B60R 22/3413 |
| 2024/0132013 A1* | 4/2024 | Jaradi | B60R 22/38 |
| 2024/0227724 A9* | 7/2024 | Jaradi | B60R 22/38 |
| 2024/0253592 A1* | 8/2024 | Zhao | F16D 41/12 |

FOREIGN PATENT DOCUMENTS

| | | | | |
|---|---|---|---|---|
| JP | 2004276742 A | | 10/2004 | |
| WO | WO-2007031217 A1 | * | 3/2007 | B60R 22/41 |
| WO | WO-2009086818 A2 | * | 7/2009 | B60R 22/4676 |
| WO | WO-2009086819 A2 | * | 7/2009 | B60R 22/46 |
| WO | WO-2018091405 A1 | * | 5/2018 | B60R 22/34 |
| WO | WO-2018183600 A1 | * | 10/2018 | |
| WO | WO-2023051454 A1 | * | 4/2023 | B60R 22/34 |
| WO | WO-2024061939 A1 | * | 3/2024 | B60R 22/46 |

* cited by examiner

US 12,344,188 B1

LOAD-LIMITING SEATBELT RETRACTOR

BACKGROUND

A seatbelt in a vehicle may be equipped with load-limiting features. During certain vehicle impacts, a retractor of the seatbelt may lock webbing of the seatbelt from further extension from the retractor, and load-limiting features may permit some additional limited extension of the webbing when the force exerted on the webbing exceeds a load-limiting threshold. This additional extension of the webbing from the retractor limits the load applied by the webbing to the chest of an occupant, which may limit chest compression. As an example, the load-limiting features may include a torsion bar disposed within a spool of the retractor that plastically deforms when the force exerted on the webbing exceeds a load-limiting threshold.

DETAILED DESCRIPTION

Figure 1:
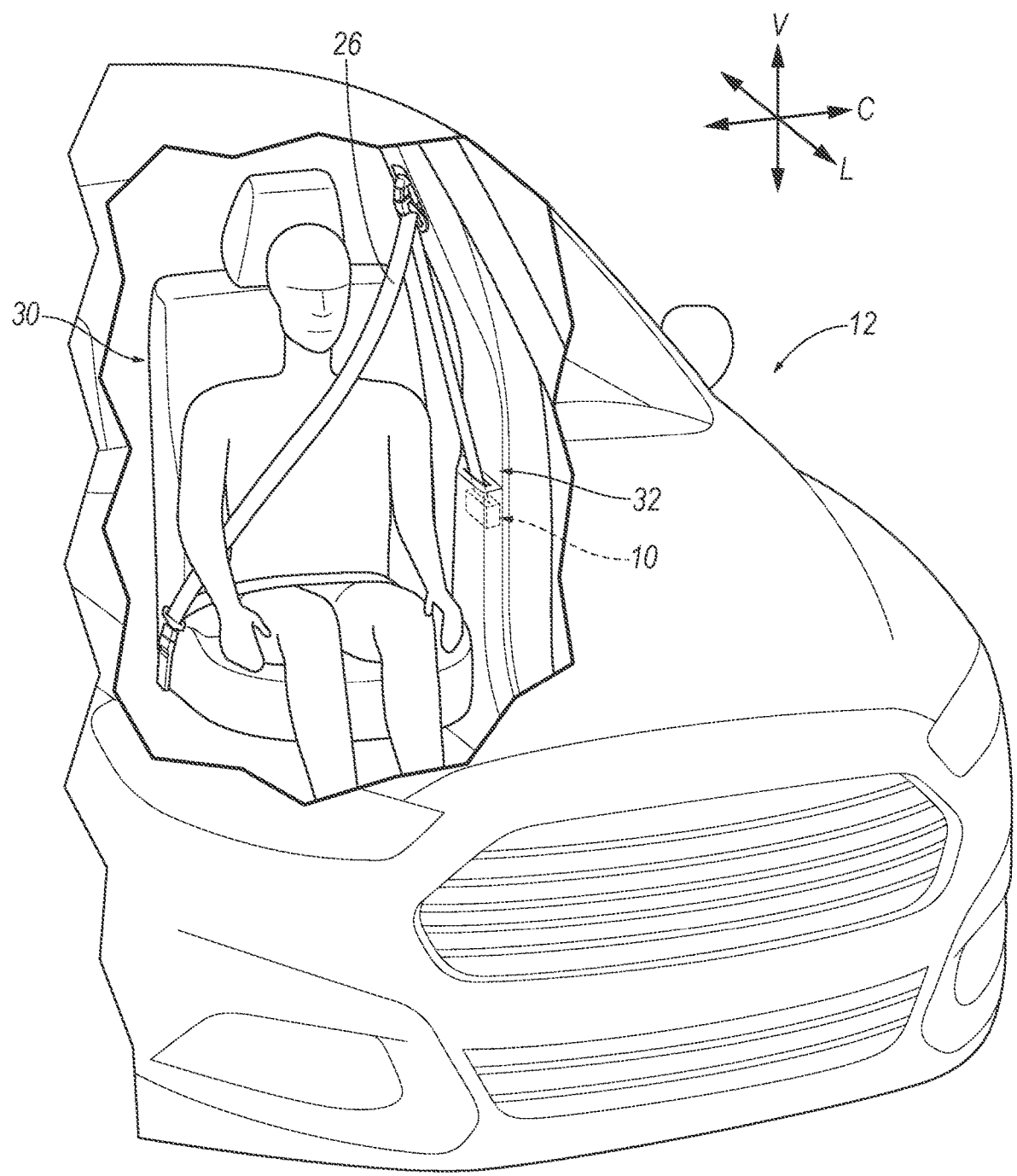
FIG. 1 is a cut-away view of a vehicle to show a seat and a seatbelt assembly.

A seatbelt retractor includes a frame and a spool rotatably supported by the frame and having a rotational axis. A ring is coaxial with the spool on the rotational axis and selectively lockable with the spool. A locking device is operatively coupled between the spool and the ring to rotationally engage the spool with the ring in a locked position and rotationally disengage the spool from the ring in an unlocked position. An arm extends between the ring and the frame. One of the ring or the frame defines a recess and the arm is fixed to and extends from the other of the ring or the frame into the recess. When the locking device is in the locked position, the arm is elastically bendable relative to the ring and the frame when rotational force on the ring relative to the frame about the rotational axis exceeds a non-zero threshold to allow rotation of the ring relative to the frame. When the locking device is in the locked position, the arm locks the ring relative to the frame about the rotational axis when rotational force on the ring relative to the frame about the rotational axis is below the non-zero threshold.

The arm may extend radially from the ring to the frame.

The arm may be metal.

The ring may include an inner surface extending annularly around the rotational axis and an outer surface extending annularly about the inner surface. The locking device may engage the inner surface. The arm may extend radially from the outer surface to the frame. The inner surface may include teeth and the locking device may include teeth, the teeth of the locking device being engaged with the teeth of the inner surface in the locked position and disengaged with the teeth of the inner surface in the unlocked position.

The frame may include a second ring extending annularly about the ring. One of the ring or the second ring may define the recess and the arm may be fixed to and extend from the other of the ring or the second ring into the recess. The locking device may be a centrifugal clutch.

The locking device may directly engage the ring in the locked position.

The arm may be elongated radially relative to the ring.

The frame may include a second ring coaxial with the spool on the rotational axis. One of the ring or the second ring may define the recess and the arm may be fixed to and extend from the other of the ring or the second ring into the recess.

The seatbelt retractor may include a plurality of arms, including the arm, between the ring and the frame. The arms may be spaced circumferentially about the ring. One of the ring or the frame may define a plurality of recesses and the arms may be fixed to and extend from the other of the ring or the frame into the recesses. When the locking device is in the locked position, the arms may be elastically bendable relative to the ring and the frame when rotational force on the ring relative to the frame about the rotational axis exceeds a non-zero threshold to allow rotation of the ring relative to the frame. When the locking device is in the locked position, the arms may lock the ring relative to the frame about the rotational axis when rotational force on the ring relative to the frame about the rotational axis is below the non-zero threshold. The arms may be spaced equidistantly annularly about the ring. The recesses and arms may be positioned so that the arms are simultaneously received in respective recesses.

The ring may include an inner surface extending annularly around the rotational axis and an outer surface extending annularly about the inner surface. The locking device may engage the inner surface. The arms may extend radially from the outer surface to the frame. Each of the arms may have a common size and shape and each of the recesses may have a common size and shape. The frame may include a second ring extending annularly about the outer surface of the ring. One of the ring or the second ring may define the recesses and the arms may be fixed to and extend from the other of the ring or the second ring into the recess. The recesses may have a trapezoidal shape.

The arm may be a flat spring.

When the locking device is in the locked position and a rotational force on the ring relative to the frame about the rotational axis exceeds the non-zero threshold, the arm may disengage the recess and exert a frictional force on the ring to resist rotation of the spool with respect to the frame.

The ring may be bonded to the frame with an adhesive that is frangible relative to the ring and/or the frame.

Figure 2:
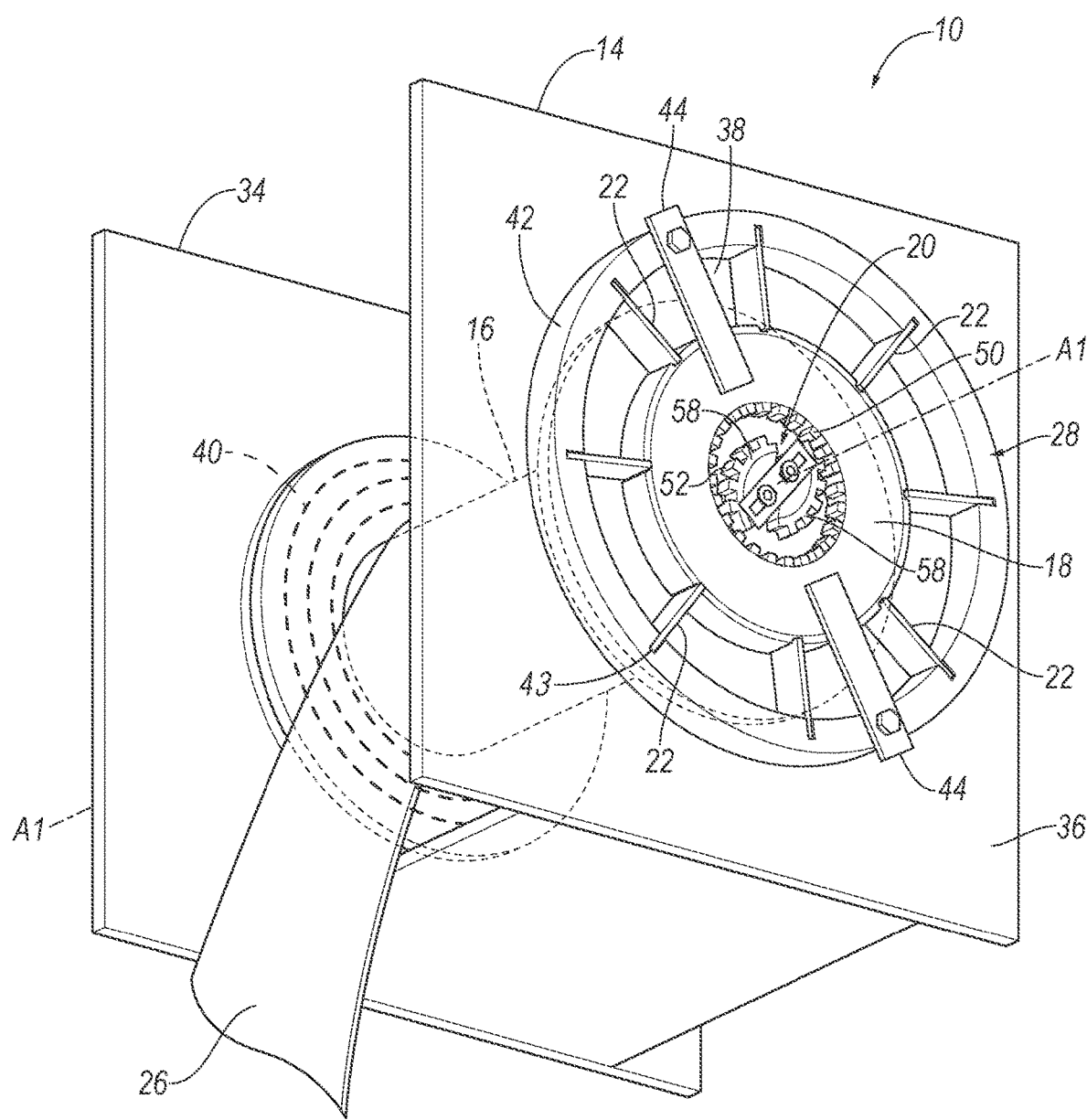
FIG. 2 is a perspective view of a seatbelt retractor of the seatbelt assembly.
Figure 3:
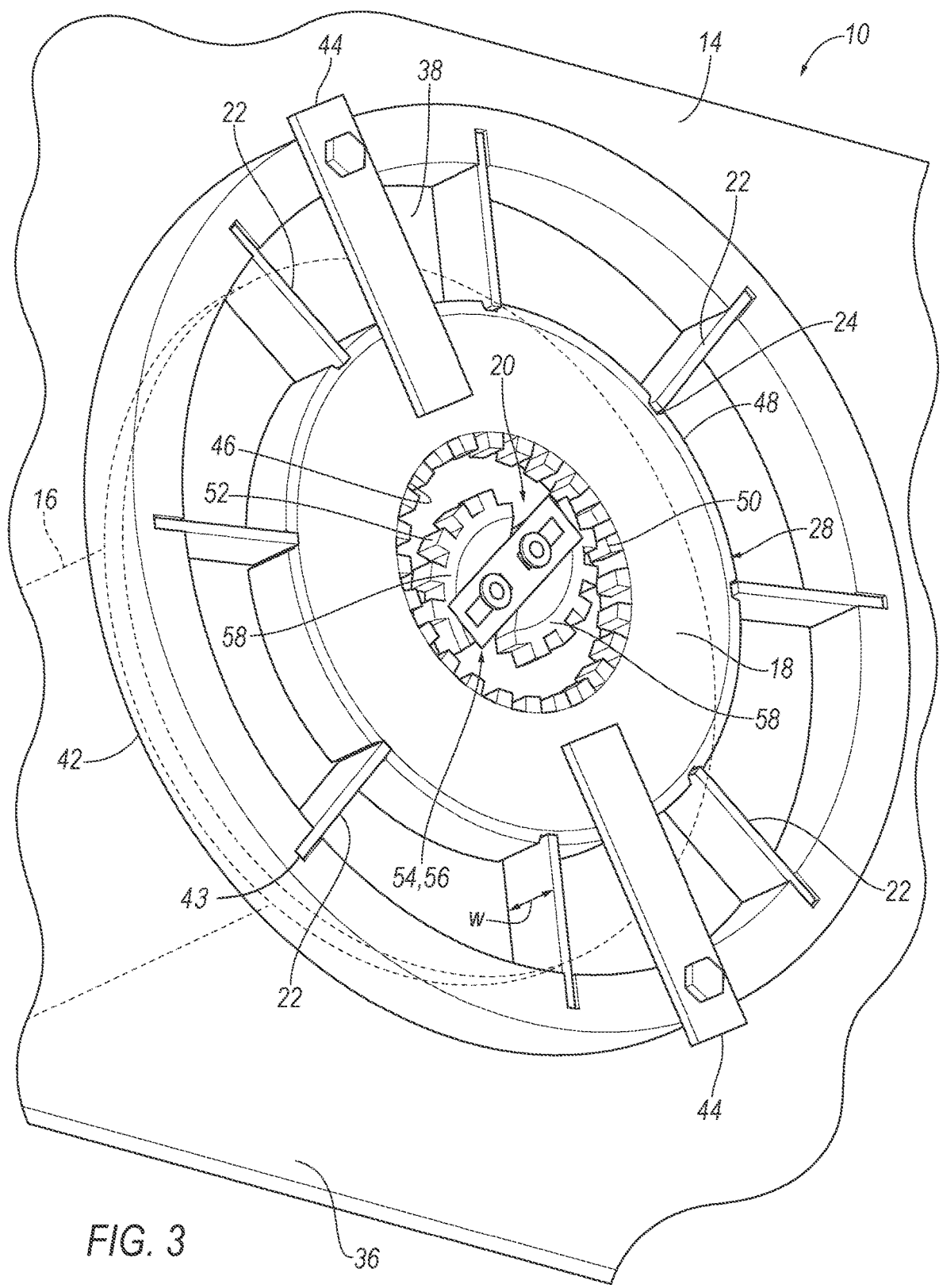
FIG. 3 is a magnified view of a portion of FIG. 2.
Figure 4:
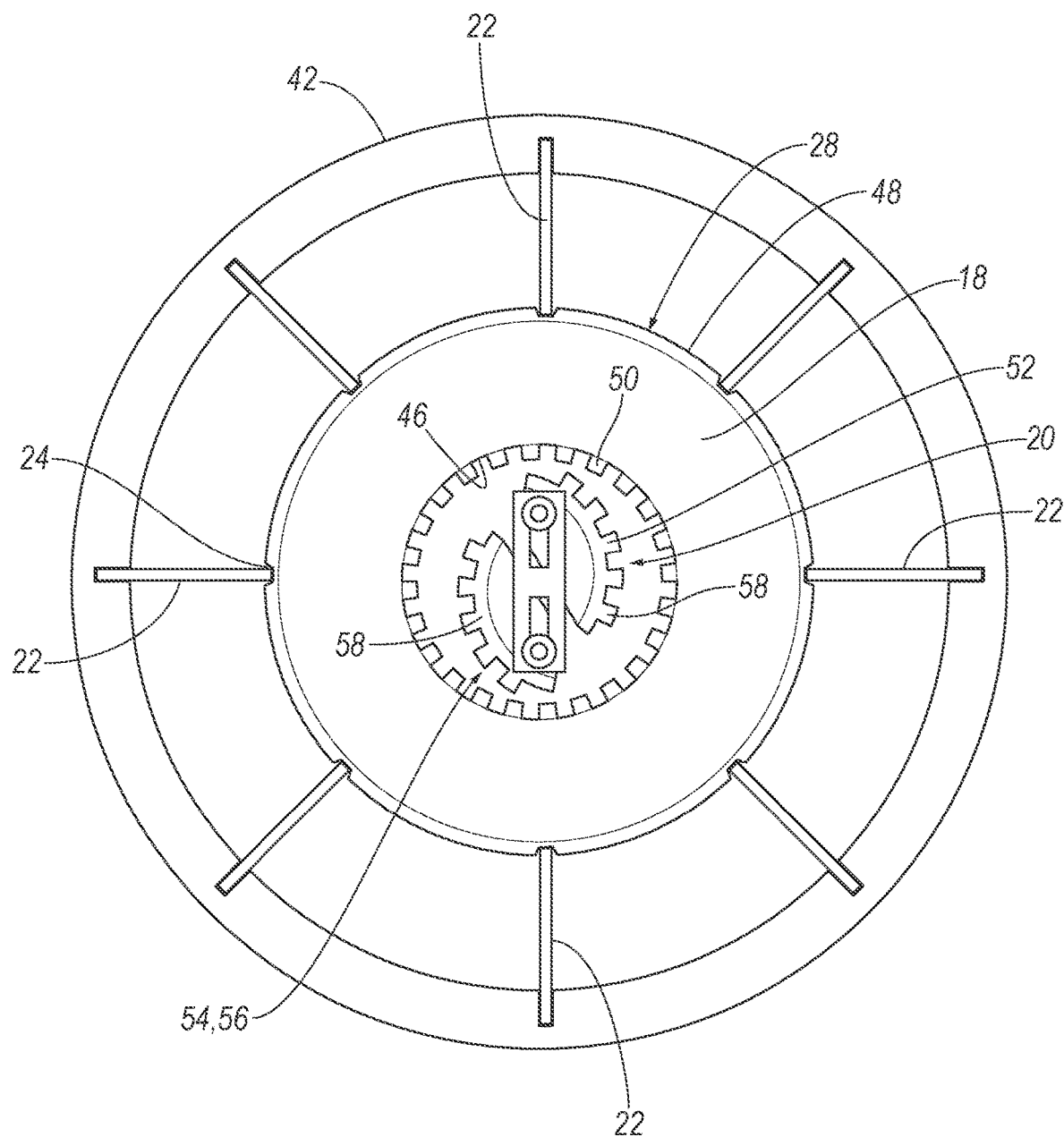
FIG. 4 is an end view of a portion of the seatbelt retractor with a locking device in an unlocked position.
Figure 5:
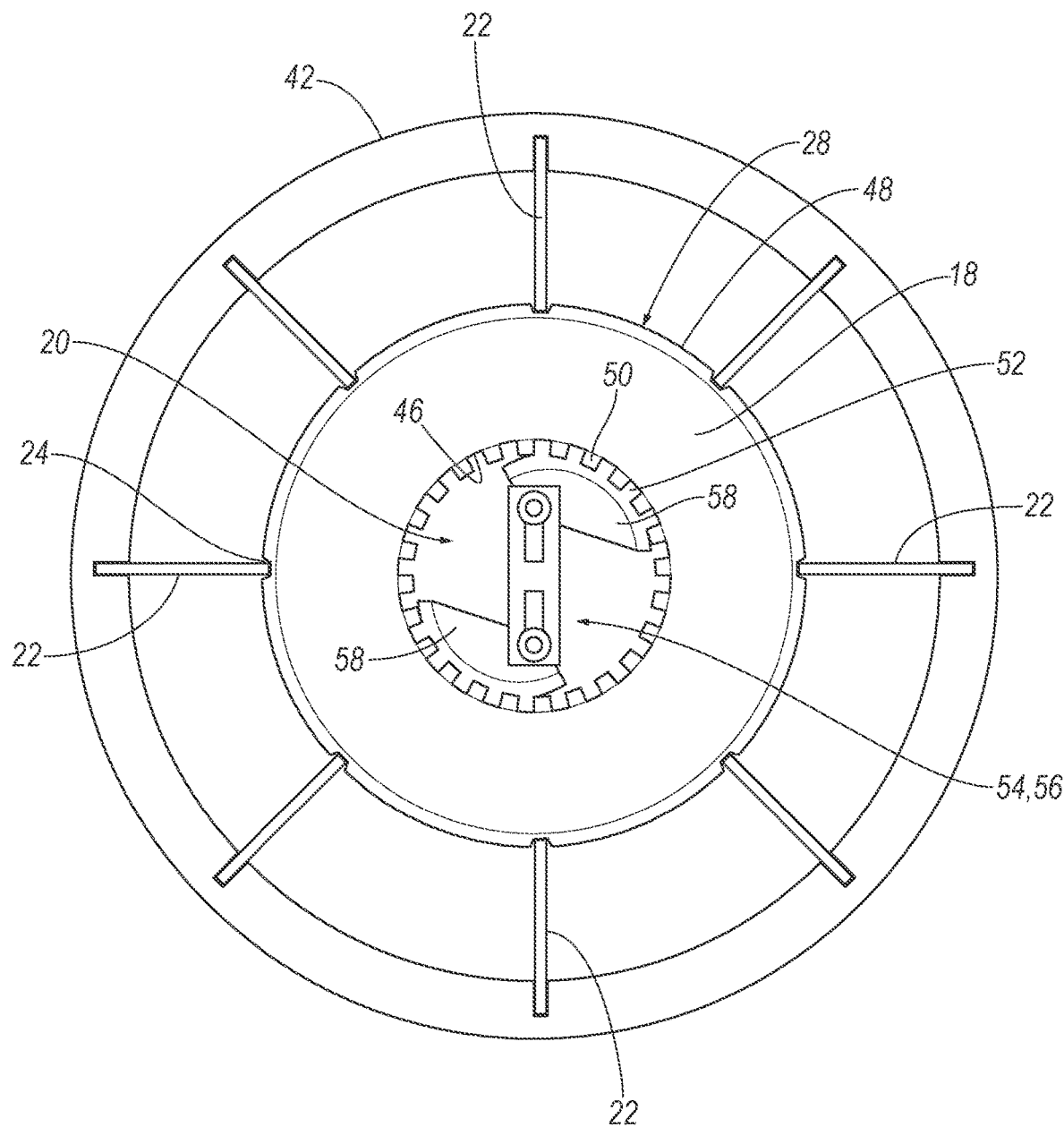
FIG. 5 is an end view of a portion of the seatbelt retractor with a locking device in a locked position and a load limiter in a design position.

With reference to the Figures, wherein like numerals indicate like parts throughout the several views, a seatbelt retractor 10 for a vehicle 12 includes a frame 14 and a spool 16 rotatably supported by the frame 14. The spool 16 has a rotational axis A1. A ring 18 is coaxial with the spool 16 on the rotational axis A1 and is selectively lockable with the spool 16. A locking device 20 is operatively coupled between the spool 16 and the ring 18 to rotationally engage the spool 16 with the ring 18 in a locked position (FIGS. 5-6) and rotationally disengage the spool 16 from the ring 18 in an unlocked position (FIGS. 2-4). An arm 22 is between the ring 18 and the frame 14. One of the ring 18 or the frame 14 defines a recess 24 and the arm 22 is fixed to and extends from the other of the ring 18 or the frame 14 into the recess 24. When the locking device 20 is in the locked position, the arm 22 is elastically bendable relative to the ring 18 and the frame 14 when rotational force on the ring 18 relative to the frame 14 about the rotational axis A1 exceeds a non-zero threshold, hereinafter referred to as a bending threshold, to allow rotation of the ring 18 relative to the frame 14. When the locking device 20 is in the locked position, the arm 22 locks the ring 18 relative to the frame 14 about the rotational axis A1 when rotational force on the ring 18 relative to the frame 14 about the rotational axis A1 is below the bending threshold.

Figure 6:
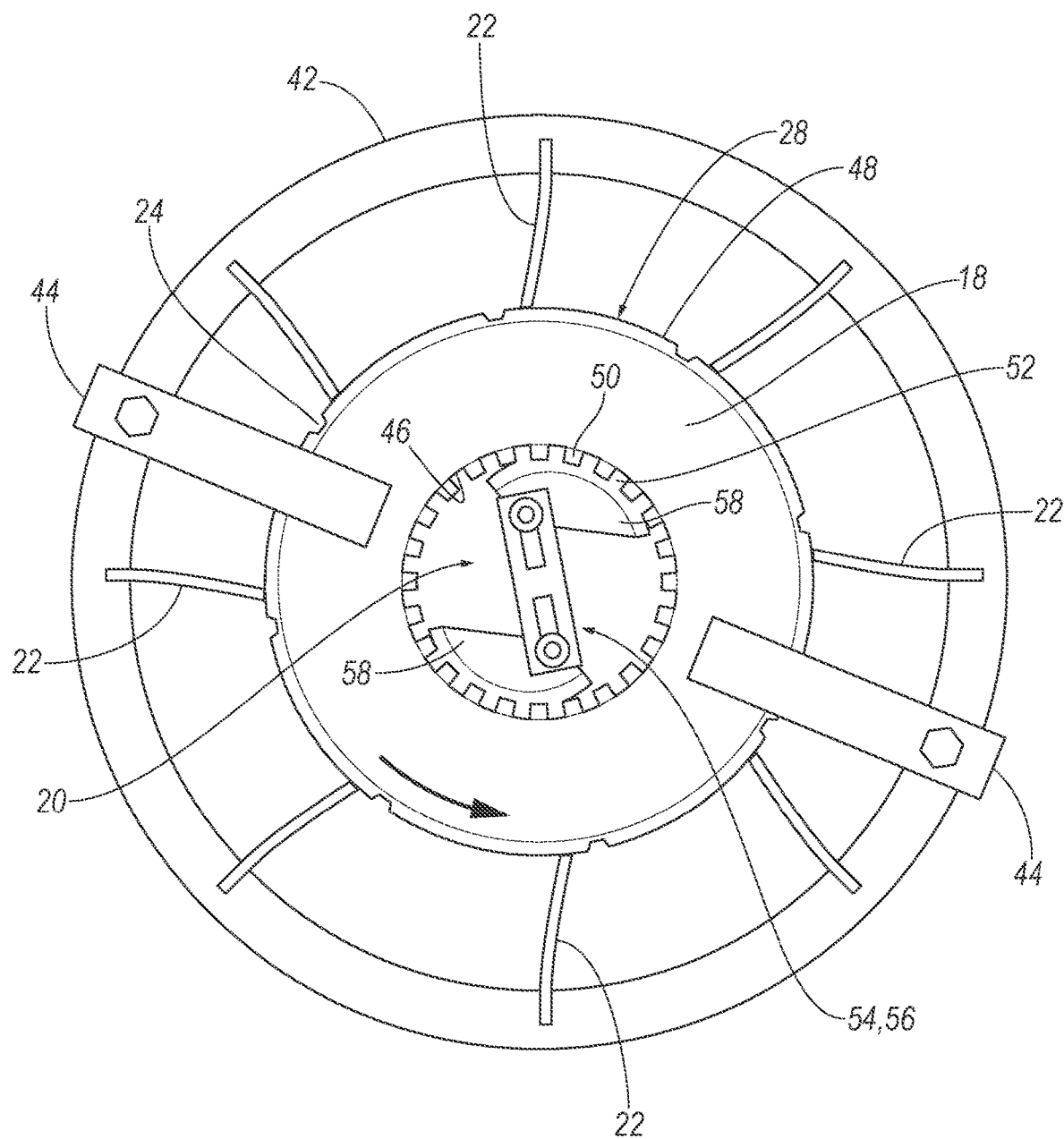
FIG. 6 is an end view of a portion of the seatbelt retractor with a locking device in a locked position and a load limiter moving from one design position to another design position.

The arm 22 bends to control payout of webbing 26 when the locking device 20 is in the locked position (FIGS. 5 and 6) and force above the bending threshold of the arm 22 is applied to the webbing 26. Specifically, when the locking device 20 is in the locked position, rotational force is transmitted from the spool 16 to the ring 18 and from the ring 18 to the arm 22. When force below the bending threshold is applied to the arm 22, the seatbelt retractor 10 is in the design position (FIG. 5) and the arm 22 remains engaged with the recess 24 to prevent rotation of the ring 18 and spool 16 relative to the frame 14. In such a situation, bending force on the arm 22 is insufficient to bend the arm 22 to release the arm 22 from the recess 24. When force exceeding the bending threshold of arm 22 is applied to the arm 22, the arm 22 resiliently bends and is disengaged from the recess 24 (FIGS. 6 and 7B). In such a situation, shear force on the arm 22 is sufficient to bend the arm 22 to release arm 22 from the recess 24. This allows for a discrete amount of rotation of the ring 18 and the spool 16, which pays out a discrete amount of the webbing 26 from the spool 16. During rotation of the ring 18 and the spool 16, friction on the arm 22 acts against rotation of the ring 18 and the spool 16 relative to the frame 14. Since the arm 22 is resiliently bendable, the retractor 10 is resettable to the design position. In other words, the retractor 10 is reusable after force above the bending threshold of the arm 22 is applied to the webbing 26 and a discrete amount of rotation of the ring 18 and the spool 16 pays out a discrete amount of webbing 26 from the spool 16.

In the example shown in the Figures, the seatbelt retractor 10 includes a load limiter 28 including a plurality of arms 22 and recesses 24, specifically, eight arms 22 and eight recesses 24. In other examples, the seatbelt retractor 10 may include any suitable number of arms 22, i.e., one or more, and any suitable number of recesses 24, i.e., one or more. The seatbelt retractor 10 in the example shown in the Figures includes the same number of arms 22 and recesses 24, and in other examples, the seatbelt retractor 10 may include a different number of arms 22 than recesses 24. In examples including more than one arm 22 and more than one recess 24, the seatbelt retractor 10 has a plurality of design positions. The arms 22 and recesses 24 may be positioned so that, when the ring 18 rotates relative to the frame 14, the arms 22 engage the recesses 24 in each design position and the seatbelt retractor 10 is reusable from each design position. The recesses 24 and arms 22 are positioned so that the arms 22 are simultaneously received in respective recesses 24.

With reference to FIG. 1, the vehicle 12 may be any suitable type of ground vehicle, e.g., a passenger or commercial automobile such as a sedan, a coupe, a truck, a sport utility, a crossover, a van, a minivan, a taxi, a bus, etc. The vehicle 12 defines a vehicle-longitudinal axis L extending between a front end (not numbered) and a rear-end (not numbered) of the vehicle 12. The vehicle 12 defines a cross-vehicle axis C extending cross-vehicle from one side to the other side of the vehicle 12. The vehicle 12 defines a vertical axis V extending through a floor and ceiling of the vehicle 12. The vehicle-longitudinal axis L, the cross-vehicle axis C, and the vertical axis V are perpendicular relative to each other. The vehicle 12 includes a vehicle frame (not numbered) and a vehicle body (not numbered). The vehicle frame and/or the vehicle body defines a passenger compartment (not numbered) to house occupants of the vehicle 12. The passenger compartment may extend across the vehicle 12, i.e., from one side to the other side of the vehicle 12. The passenger compartment includes a front and a rear.

The vehicle 12 includes one or more seats 30 in the passenger compartment. The seats 30 may be arranged in any suitable manner in the passenger compartment. The seats 30 may be of any suitable type, e.g., a bucket seat, bench seat, etc.

The vehicle 12 includes one or more seatbelt assemblies 32. Specifically, one or more of the seatbelt assemblies 32 includes the seatbelt retractor 10 and the webbing 26 extendable from the seatbelt retractor 10. The vehicle 12 may include any suitable number of seatbelt assemblies 32, for example, one seatbelt assembly 32 for each seat 30. In the example shown in the Figures, one seat 30 at a front-left position is shown to include the seatbelt assembly 32, and any seat in any position in the passenger compartment may include the seatbelt assembly 32.

The seatbelt assembly 32, when fastened, is designed to control the kinematics of the occupant during certain vehicle impacts or sudden stops. A "certain vehicle impact" is an impact of the type and/or magnitude for which the seatbelt assembly 32 is designed to operate, i.e., "certain" indicates the type and/or magnitude of the impact. The seatbelt assembly 32 may include an anchor coupled to the webbing 26, and a clip that engages a buckle. Each seatbelt assembly 32 may be disposed adjacent to one of the seats 30. The seatbelt assembly 32 may be a three-point harness, meaning that the webbing 26 is attached at three points around the occupant when fastened. The seatbelt assembly 32 may, alternatively, include another arrangement of attachment points.

The webbing 26 may extend continuously from the seatbelt retractor 10 to the anchor. For example, one end of the webbing 26 feeds into the seatbelt retractor 10, and the other end of the webbing 26 is fixed to the anchor. The anchor may, for example, be fixed to the seat and/or to the vehicle body, e.g., the pillar, the floor, etc. The webbing 26 may be fabric, e.g., polyester. The clip slides freely along the webbing 26 and, when engaged with the buckle, divides the webbing 26 into a lap band and a shoulder band.

With reference to FIG. 2, the seatbelt retractor 10 provides payout and retraction of the webbing 26, e.g., via rotation of the spool 16. As described above, the seatbelt retractor 10 includes the frame 14. The frame 14 supports other components of the seatbelt retractor 10. The frame 14 may include a first plate 34 and a second plate 36 spaced from the first plate 34 along the rotational axis A1 of the spool 16. The frame 14 may be of any suitable size and shape. The frame 14 may be of any suitable material, e.g., plastic, metal, composite, etc. The seatbelt retractor 10 may be supported at any suitable location in the vehicle 12.

The spool 16 is rotatably supported by the frame 14. For example, a first end of the spool 16 is rotatably supported by the frame 14, e.g., the first plate 34, and a second end of the spool 16 is rotatably supported by the frame 14, e.g., the second plate 36. The spool 16 is elongated along the rotational axis A1 from the first end to the second end. The spool 16 is rotatable about the axis A1. For example, the first end of the spool 16 may be supported in an opening defined by the first plate 34 and the second end may be supported in an opening 38 defined by the second plate 36. In other words, the spool 16 is free to rotate about the axis A1 relative to the first plate 34 and the second plate 36 when the locking device 20 is unlocked.

With reference to FIGS. 2 and 3, the spool 16 may include a cylinder and two flanges (not numbered). The cylinder may be elongated along the axis A1 between the first end and the second end. As an example, shown in the Figures, the spool 16 includes one flange at the first end of the spool 16 and the other flange at the second end of the spool 16. The cylinder is elongated from one flange to the other flange. The flanges maintain the position of the webbing 26 relative to the spool 16, i.e., the webbing 26 is between the flanges. As shown in the Figures, the flanges extend in a direction radially away from the axis A1.

The webbing 26 is supported by the spool 16. Specifically, the webbing 26 is supported on the cylinder between the two flanges. The cylinder may include a slot elongated along the axis A1. The slot is sized and shaped to receive the webbing 26. The webbing 26 may be in the slot and wound around the spool 16. The webbing 26 may be, for example, fixed to the spool 16 through the slot. The webbing 26 may be fixed to the spool 16 in any suitable manner.

The seatbelt retractor 10 includes a return spring 40. The return spring 40 may be supported by the frame 14 and operatively engaged with the spool 16 to apply torque to the spool 16 relative to the frame 14. The return spring 40 may be coupled to the spool 16 and the frame 14. In the example shown in FIG. 2, the return spring 40 is disposed at the first plate 34 of the frame 14 and is engaged with the first end of the spool 16 to retract the webbing 26, i.e., when the locking device 20 is unlocked. The return spring 40 may be loaded in tension or compression when the webbing 26 is fully retracted, and the return spring 40 may be further loaded in either tension or compression when the webbing 26 is extended from the spool 16. When force is exerted on the webbing 26, the return spring 40 may uncoil and the webbing 26 may payout from the spool 16. When the force applied to the webbing 26 is released, no rotational force is exerted on the spool 16 and the return spring 40 exerts a force tending to retract the webbing 26. The return spring 40 may be, for example, a spiral torsion return spring 40 or any other suitable type of return spring 40.

The seatbelt retractor 10 may be free of having a torsion bar between the spool 16 and the frame 14. In other words, the seatbelt retractor 10 may not include a conventional torsion bar between the locking device 20 and the spool 16.

As set forth above, a load limiter 28 can be positioned between the spool 16 and the frame 14. The load limiter 28 is selectively engageable with the spool 16 by the locking device 20. In other words, the locking device 20 may couple the spool 16 to the load limiter 28 to deliver rotational force of the spool 16 to the load limiter 28. In the event the force delivered to the spool 16 is below the bending threshold, the load limiter 28 stays in the design position and the lock and the load limiter 28 prevent rotation of the spool 16 relative to the frame 14 to prevent extension of webbing 26 from the seatbelt retractor 10. In the event the force delivered to the spool 16 is above the bending threshold, the load limiter 28 allows for a discrete amount of rotation of the ring 18 and the spool 16, which pays out a discrete amount of the webbing 26 from the spool 16.

The ring 18 is coaxial with the spool 16 on the rotational axis A1. The spool 16 is rotatable relative to the ring 18 when the locking device 20 is unlocked, as described further below. When the locking device 20 is locked, the locking device 20 couples the spool 16 and the ring 18 so that the spool 16 and the ring 18 rotate together in unison when rotational force applied by the spool 16 to the ring 18 exceeds the bending threshold of the arms 22. The locking device 20 is releasably locked to the ring 18, as described further below.

The load limiter 28 includes the ring 18, at least one arm 22, and at least one recess 24. Specifically, as set forth above, the example shown in the Figures includes eight arms 22 and eight recesses 24. One of the ring 18 or the frame 14 defines the recesses 24 and the arms 22 are fixed to and extend from the other of the ring 18 or the frame 14 into the recesses 24, respectively. In the example shown in the Figures, the ring 18 defines the recesses 24 and the arms 22 are fixed to the frame 14. In other examples, the frame 14 may define the recesses 24 and the arms 22 may be fixed to the ring 18.

The frame 14 may include a second ring 42, as shown in the example in the Figures. As an example, the second ring 42 is fixed to the second plate 36, e.g., by welding, adhesive, unitary formation, etc. The second ring 42 extends annularly about the ring 18. The second ring 42 is coaxial with the ring 18 and the spool 16 on the rotational axis A1. One of the ring 18 or the second ring 42 defines the recesses 24 and the arms 22 are fixed to and extend from the other of the ring 18 or the second ring 42 into the recesses 24, respectively. In other examples that do not include the second ring 42, one of the ring 18 or the frame 14 defines the recesses 24 and the arms 22 are fixed to and extend from the other of the ring 18 or the frame 14 into the recesses 24, respectively. In any event, in examples including multiple arms 22 and recesses 24, the arms 22 and recesses 24 are spaced annularly about the rotational axis A1.

In the example shown in the Figures, the arms 22 are fixed in slots 43 that are formed in the second ring 42. The arms 22 may be fixed to the second ring 42 by, for example, adhesive, welding, mechanical connection, etc. While the recesses 24 and slots 43 are show in the Figures as open ended, the recesses 24 and slots 43 can be closed ended recesses or openings.

The ring 18 and the frame 14, e.g., the second ring 42, define a circular path of relative movement of the arms 22 and recesses 24. The arms 22 and the recesses 24 are concentric on the circular path such that, as the ring 18 rotates relative to the frame 14 in the examples described herein, the arms 22 and the recesses 24 are aligned so that the arms 22 engage the recesses 24 after rotation. The arms 22 are spaced circumferentially from each other along the circular path and the recesses 24 are spaced circumferentially from each other along the circular path.

The ring 18 is supported by the frame 14. In the example in the Figures, the seatbelt retractor 10 includes retainers 44 that retain the ring 18 to the frame 14. Specifically, the retainers 44 retain the ring 18 in the opening of the second plate 36. The retainers 44 abut the ring 18 and prevent movement of the ring 18 along the rotational axis A1 away from the spool 16. The ring 18 slides along the retainers as the ring 18 rotates relative to the frame 14.

In some examples, the ring 18 can be bonded to the frame 14 and/or the retainers 44 with an adhesive (not visible). In both cases the adhesive is frangible relative to the ring 18 and/or the frame 14 and the retainers 44. Bonding the ring 18 to the frame 14, and/or retainers 44 can help reduce any rattling during normal operation.

The ring 18 includes an inner surface 46 extending annularly around the rotational axis A1 and an outer surface 48 extending annularly about the inner surface 46. In the example shown in the Figures, the inner surface 46 includes teeth 50 and the locking device 20 includes teeth 52 that selectively engage the teeth 50 on the inner surface 46 of the ring 18.

As set forth above, when the locking device 20 is in the locked position, the arms 22 are elastically bendable relative to the ring 18 and the frame 14 when rotational force on the ring 18 relative to the frame 14 about the rotational axis A1 exceeds the bending threshold to allow rotation of the ring 18 relative to the frame 14. When the locking device 20 is in the locked position, the arms 22 lock the ring 18 relative to the frame 14 about the rotational axis A1 when rotational force on the ring 18 relative to the frame 14 about the rotational axis A1 is below the bending threshold. The bending threshold is designed to selectively prevent rotation of the ring 18 relative to the frame 14, and thus prevent rotation of the ring 18 relative to the frame 14, to control the kinematics of an occupant to selectively allow rotation of the ring 18 relative to the frame 14, and thus pay out webbing 26 from the seatbelt retractor 10, to limit chest compression of the occupant. The bending threshold may be based on, for example, the dimensions and geometry of the arms 22, the dimensions and geometry of the recesses 24, the material type of the arms 22, the length of extension of the arms 22 into the recesses 24, etc. The bending threshold has a magnitude above zero. The bending threshold may be empirically determined.

As set forth above, the arms 22 are resiliently bendable. In other words, when an arm 22 is at a recess 24, the arm 22 has an extended position extending into the recess 24. In the event the ring 18 rotates relative to the frame 14, the arm 22 abuts the ring 18 spaced from the recess 24 and the arm 22 is bent from the extended position. When the arm 22 is again at a recess 24 after further rotation of the ring 18 relative to the frame 14, the arm 22 again resiliently returns to the extended position.

Figure 7A:
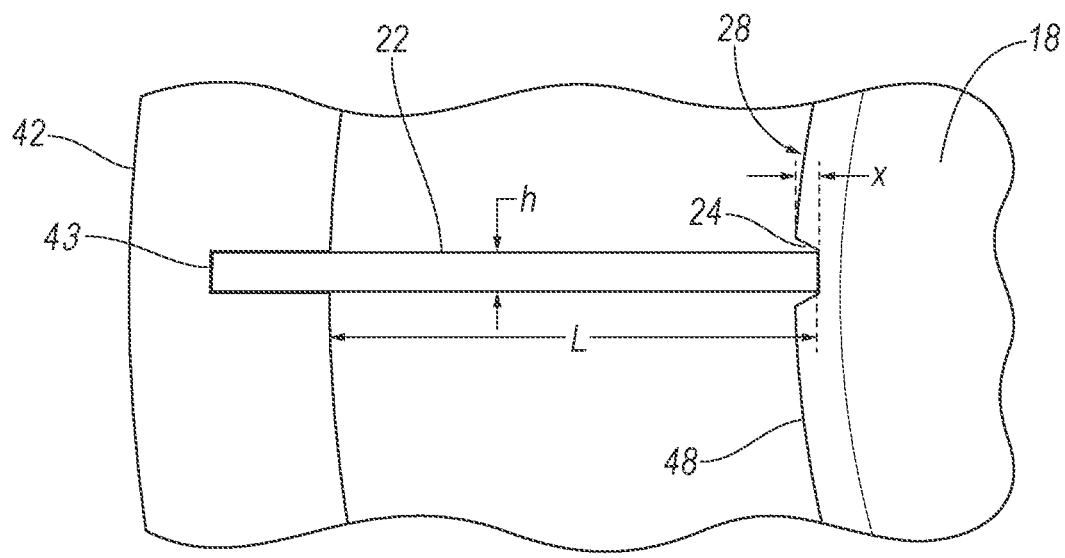
FIG. 7A is a magnified view of a portion of FIG. 5.
Figure 7B:
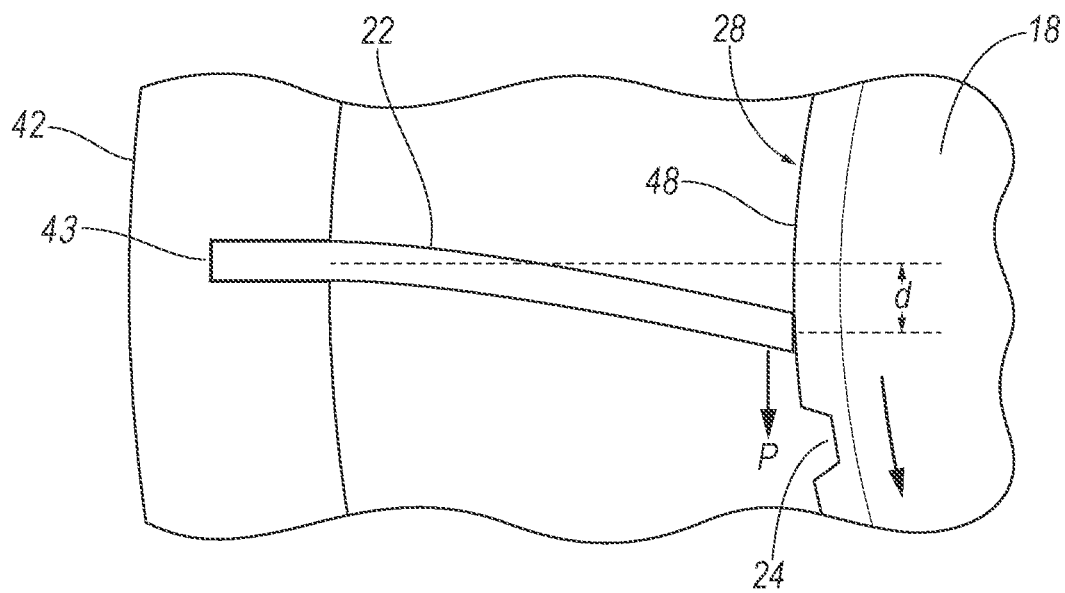
FIG. 7B is a magnified view of a portion of FIG. 6.

In some examples, the recesses 24 can have a trapezoidal shape having a depth x (FIG. 7A). The angled side surfaces of the recesses 24 can facilitate the arms 22 to be pulled from the recesses 24 when the ring 18 rotates relative to the frame 14. The trapezoidal shape of the recesses 24 allows for the bend of the arm 22 and allows the arm 22 to exit and enter the recesses 24 without localized stress. While trapezoidal shaped recesses are shown and described herein, other shapes are possible including for example, V-shaped recesses, arcuate recesses, and rectangular recesses. In some examples, the recesses 24 can have a depth x of approximately 0.5 mm.

The arms 22 may be of any suitable type of material that allows the arms 22 to resiliently bend. As one example, the arms 22 may be metal. The arms 22 may be, for example, spring steel.

As set forth above, the arms 22 are fixed to the frame 14 or the ring 18. In other words, the arms 22 move relative to the frame 14/ring 18 to which the arms 22 are fixed and move relative to the other of the frame 14 and ring 18 when the ring 18 rotates relative to the frame 14. The arms 22 may be fixed to the frame 14 or the ring 18 by, for example, adhesive, welding, mechanical connection, etc.

The arms 22 extend radially from the ring 18 to the frame 14. Specifically, the arms 22 extend radially from the outer surface 48 to the frame 14. The arms 22 are sized to extend into the respective recess 24 in the extended position.

In the example shown in the Figures, the arms 22 are elongated radially relative to the ring 18 with a rectangular cross-section and the recesses 24 have a trapezoidal shape. In other examples, the arms 22 and the recesses 24 may have any suitable shape. In some examples, including the example shown in the Figures, each of the arms 22 have a common size and shape and each of the recesses 24 have a common size and shape.

As set forth above, the arms 22 and the recesses 24 are spaced annularly about the ring 18. In the example shown in the Figures, the arms 22 are spaced from each other equidistantly about the ring 18 and the recesses 24 are spaced from each other equidistantly about the ring 18. In such examples, the arms 22 and the recesses 24 are positioned so that the arms 22 are simultaneously received in respective recesses 24 in a design position.

The arms 22 bend to control payout of the webbing 26 when the locking device 20 is in the locked position and a load above the bending threshold of the arms 22 is applied to the webbing 26. Specifically, when the locking device 20 is in the locked position, rotational force is transmitted from the spool 16 to the ring 18 and from the ring 18 to the arms 22. In the example shown in the Figures, the arms 22 are fixed to the frame 14, specifically the second ring 42, so that when the ring 18 transmits rotational force to the arms 22, the arms 22 bend between the ring 18 and the frame 14 when the force transmitted from the ring 18 to the arms 22 exceeds the bending threshold of the arms 22. In such a situation, in the example shown in the Figures, friction between the arms 22 and the ring 18 resists rotation of the ring 18 relative to the frame 14. Thus, when the locking device 20 is in the locked position and a rotational force on the ring 18 relative to the frame 14 about the rotational axis A1 exceeds the non-zero threshold, the arm 22 disengages the recesses 24 and exerts a frictional force on the outer surface 48 of ring 18 to resist rotation of the spool 16 with respect to the frame 14.

When force below the bending threshold is applied to the arms 22, the seatbelt retractor 10 is in the design position and the arms 22 remains engaged with the recesses 24 to prevent rotation of the ring 18 and spool 16 relative to the frame 14. When force exceeding the bending threshold of the arms 22 is applied to the arms 22, the arms 22 resiliently bend and are disengaged from the respective recesses 24. This allows for a discrete amount of rotation of the ring 18 and the spool 16, which pays out a discrete amount of the webbing 26 from the spool 16. During this rotation, the arms 22 each reach another of the recesses 24 and resiliently extend into the respective recesses 24. In the event the force on ring 18 is below the bending threshold, e.g., due to decreased force on the webbing 26 or unlocking of the locking device 20, the arms 22 remain engaged in the recesses 24 and the seatbelt retractor 10 is in the design position. In the event the force on the ring 18 is above the bending threshold after the arms 22 engage the recesses 24, the arms 22 again resiliently bend, allowing for another discrete amount of rotation of the ring 18 and the spool 16. The rotation of the ring 18 and the spool 16 relative to the frame 14 ceases and the seatbelt retractor 10 returns to the design position when the force applied by the spool 16 to the ring 18 falls below the bending threshold of the arms 22. Thus, the retractor, specifically the load limiter 28, is resettable to the design position. In other words, the retractor is reusable after force above the bending threshold of the arms 22 is applied to the webbing 26 and a discrete amount of rotation of the ring 18 and the spool 16 pays out a discrete amount of webbing 26 from the spool 16.

As set forth above, the ring 18 is selectively lockable with the spool 16. The locking device 20 is operatively coupled between the spool 16 and the ring 18 to rotationally engage the spool 16 with the ring 18 in a locked position and rotationally disengage the spool 16 from the ring 18 in an unlocked position. In the example shown in the Figures, the locking device 20 directly engages the ring 18 in the locked position. For example, the inner surface 46 includes teeth 50 and the locking device 20 includes teeth 52. In such examples, the teeth 52 of the locking device 20 are engaged with the teeth 50 of the inner surface 46 in the locked position and disengaged with the teeth 50 of the inner surface 46 in the unlocked position.

The seatbelt retractor 10 includes the locking device 20 operatively coupled between the spool 16 and the arm 22 to engage the spool 16 with the arm 22. As shown in FIG. 2, the locking device 20 may be supported at the second end of the spool 16 and the second plate 36 of the frame 14. The spool 16 may be between the return spring 40 and the locking device 20 along the axis A1. The locking device 20 is movable from an unlocked position, shown in FIG. 2, in which torque is not transferred from the spool 16 to the arm 22, to a locked position in which torque is transferred from the spool 16 to the arm 22. Specifically, in the unlocked position, the spool 16 rotates relative to the ring 18 and in the locked position the spool 16 rotates as a unit with the ring 18.

The locking device 20 may be lockable with the ring 18. Specifically, the locking device 20 is fixed to and rotates with the spool 16 when the locking device 20 is unlocked with the ring 18. When locked with the ring 18, the locking device 20 couples the ring 18 and the spool 16 so that the ring 18 and the spool 16 rotate together as a unit. The locking device 20 may include an inertia clutch 54 that moves the locking device 20 from the unlocked position to the locked position in response to a vehicle 12 deceleration. The inertia clutch 54 may be supported by the spool 16 and lockable with the ring 18. For example, the inertia clutch 54 may include one or more pawls 58 supported at the second end of the spool 16. As an example, the inertia clutch 54 may be a centrifugal clutch 56 in which centrifugal force from an increase in rotation speed of the spool 16, e.g., when a certain load is applied to the webbing 26, may urge the pawls 58 radially outward to the locked position. As another example, the locking device 20 may be moved from the unlocked position to the locked position in response to deceleration of the vehicle 12, e.g., a sudden slowing of the vehicle 12, sudden stop, etc., of the vehicle 12.

The locking device 20 may be moved from the unlocked position to the locked position in response to an activation sensor (not shown). The activation sensor senses sudden deceleration of the vehicle 12 and triggers activation of the locking device 20, i.e., moves the locking device 20 to the locked position. The locking device 20 may include any suitable structure for selectively transferring torque, e.g., including conventional structures. The locking device 20 is resettable. In other words, the locking device 20 may be unlocked from the ring 18, e.g., when the inertia clutch is released, to allow the spool 16 to rotate freely relative to the ring 18. The locking device 20 may be of the type known in the art including, in some examples, those used in locking retractors.

With reference to FIGS. 7A and 7B, as set forth above, the bending threshold may be based on, for example, the dimensions and geometry of the arms 22, the dimensions and geometry of the recesses 24, the material type of the arms 22, the length of extension of the arms 22 into the recesses 24, etc. For example, the cantilever beam deflection Equation 1 can be solved for load P based on a deflection d that is sufficient to pull the arm 22 from the recess 24. The arms can be elongated strips of metal i.e., flat springs. The elongation of the arms 22 allows for tuning of the system. Deflection d can be determined empirically by testing e.g., different materials, arm dimensions (i.e., L, h, w), and recess depths x.

$$d = \frac{PL^3}{3EI} \quad (1)$$

$$I = \frac{wh^3}{12} \quad (2)$$

Where d is the deflection of the arm, P is the load on the arm, L is the unsupported length of the arm, E is the modulus of elasticity, and I is the moment of inertia. The moment of inertia I can be calculated with Equation 2 based on the width w and height h of the arm cross-section.

TABLE 1

| P kN (per arm) | L mm | h mm | W mm | E MPa | ~d mm | Load for 8 arms kN |
|---|---|---|---|---|---|---|
| 0.25 | 20 | 1.2 | 5 | 210000 | 4.5 | 2 |
| 0.50 | 20 | 1.5 | 5 | 210000 | 4.5 | 4 |
| 0.75 | 20 | 1.7 | 5 | 210000 | 4.5 | 6 |

As can be seen in Table 1, changing the height h and the number of arms can adjust the resulting overall load. Also, changing the width w and height Z of the arms can increase or decrease the load for a given deflection d. Furthermore, changing the material and its corresponding modulus of elasticity can result in different loads. In one example, the material can be high-strength spring steel with a modulus of elasticity E of 210000 MPa. Table 1 provides example dimensions for different arm configurations.

In some examples, the overall load of the arms 22 can be made to increase or decrease as the ring 18 rotates with respect to the second ring 42. For example, every other arm 22 can be designed to shear off or plastically bend such that the load associated with these arms decreases as the ring 18 rotates. As these arms 22 bend as a result of engagement with the corresponding recesses 24, the load increases up until the arms shear/break or permanently deform (i.e., plastically deform) at which point the load associated with these arms would go to zero or diminish, respectively.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt retractor comprising:
a frame;
a spool rotatably supported by the frame and having a rotational axis;
a ring coaxial with the spool on the rotational axis and selectively lockable with the spool; and
a locking device operatively coupled between the spool and the ring to rotationally engage the spool with the ring in a locked position and rotationally disengage the spool from the ring in an unlocked position; and an arm extending between the ring and the frame;

one of the ring or the frame defining a recess and the arm being fixed to and extending from the other of the ring or the frame into the recess;

when the locking device is in the locked position, the arm is elastically bendable relative to the ring and the frame when rotational force on the ring relative to the frame about the rotational axis exceeds a non-zero threshold to allow rotation of the ring relative to the frame; and when the locking device is in the locked position, the arm locks the ring relative to the frame about the rotational axis when rotational force on the ring relative to the frame about the rotational axis is below the non-zero threshold.

2. The seatbelt retractor as set forth in claim 1, wherein the arm extends radially from the ring to the frame.

3. The seatbelt retractor as set forth in claim 1, wherein:
the ring includes an inner surface extending annularly around the rotational axis and an outer surface extending annularly about the inner surface;
the locking device engages the inner surface; and
the arm extends radially from the outer surface to the frame.

4. The seatbelt retractor as set forth in claim 3, wherein the inner surface includes teeth and the locking device includes teeth, the teeth of the locking device being engaged with the teeth of the inner surface in the locked position and disengaged with the teeth of the inner surface in the unlocked position.

5. The seatbelt retractor as set forth in claim 4, wherein the frame includes a second ring extending annularly about the ring, one of the ring or the second ring defining the recess and the arm being fixed to and extending from the other of the ring or the second ring into the recess.

6. The seatbelt retractor as set forth in claim 3, wherein the locking device is a centrifugal clutch.

7. The seatbelt retractor as set forth in claim 1, wherein the locking device directly engages the ring in the locked position.

8. The seatbelt retractor as set forth in claim 1, wherein the arm is elongated radially relative to the ring.

9. The seatbelt retractor as set forth in claim 1, wherein the frame includes a second ring coaxial with the spool on the rotational axis, one of the ring or the second ring defining the recess and the arm being fixed to and extending from the other of the ring or the second ring into the recess.

10. The seatbelt retractor as set forth in claim 1, further comprising a plurality of arms, including the arm, between the ring and the frame, the arms being spaced circumferentially about the ring;

one of the ring or the frame defining a plurality of recesses and the arms being fixed to and extending from the other of the ring or the frame into the recesses;

when the locking device is in the locked position, the arms are elastically bendable relative to the ring and the frame when rotational force on the ring relative to the frame about the rotational axis exceeds a non-zero threshold to allow rotation of the ring relative to the frame; and when the locking device is in the locked position, the arms lock the ring relative to the frame about the rotational axis when rotational force on the ring relative to the frame about the rotational axis is below the non-zero threshold.

11. The seatbelt retractor as set forth in claim 10, wherein the arms are spaced equidistantly annularly about the ring.

12. The seatbelt retractor as set forth in claim 10, wherein the recesses and arms are positioned so that the arms are simultaneously received in respective recesses.

13. The seatbelt retractor as set forth in claim 10, wherein:
the ring includes an inner surface extending annularly around the rotational axis and an outer surface extending annularly about the inner surface;
the locking device engages the inner surface; and
the arms extend radially from the outer surface to the frame.

14. The seatbelt retractor as set forth in claim 10, wherein each of the arms have a common size and shape and each of the recesses have a common size and shape.

15. The seatbelt retractor as set forth in claim 14, wherein the frame includes a second ring extending annularly about the outer surface of the ring, one of the ring or the second ring defining the recesses and the arms being fixed to and extending from the other of the ring or the second ring into the recesses.

16. The seatbelt retractor as set forth in claim 14, wherein the recesses have a trapezoidal shape.

17. The seatbelt retractor as set forth in claim 1, wherein the arm is a flat spring.

18. The seatbelt retractor as set forth in claim 1, wherein when the locking device is in the locked position and a rotational force on the ring relative to the frame about the rotational axis exceeds the non-zero threshold, the arm disengages the recess and exerts a frictional force on the ring to resist rotation of the spool with respect to the frame.

19. The seatbelt retractor as set forth in claim 1, wherein the ring is bonded to the frame with an adhesive that is frangible relative to the ring and/or the frame.

20. The seatbelt retractor as set forth in claim 1, wherein the locking device is a centrifugal clutch supported at an end of the spool.

* * * * *